US007698471B2

(12) United States Patent
Aoki et al.

(10) Patent No.: US 7,698,471 B2
(45) Date of Patent: Apr. 13, 2010

(54) PRINT SYSTEM, INFORMATION PROCESSING DEVICE AND CONTROL METHOD FOR THE SAME, PRINTER AND CONTROL METHOD FOR THE SAME, STORAGE MEDIUM, AND PROGRAM

(75) Inventors: Nobushige Aoki, Kanagawa (JP); Shinichi Yuga, Kanagawa (JP); Yurika Kadoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 750 days.

(21) Appl. No.: 10/679,335

(22) Filed: Oct. 7, 2003

(65) Prior Publication Data

US 2005/0262274 A1 Nov. 24, 2005

(30) Foreign Application Priority Data

Oct. 18, 2002 (JP) .............................. 2002-303941

(51) Int. Cl.
*G06F 3/00* (2006.01)
(52) U.S. Cl. ........................ 710/15; 715/274; 358/1.15; 358/527
(58) Field of Classification Search .................. 710/15; 358/1; 347/19; 345/660
See application file for complete search history.

(56) References Cited

U.S. PATENT DOCUMENTS

| 6,947,158 B1* | 9/2005 | Kitamura et al. ........... 358/1.15 |
| 2002/0054350 A1* | 5/2002 | Kakigi et al. .............. 358/1.16 |
| 2003/0085942 A1* | 5/2003 | Narusawa et al. ............. 347/19 |
| 2003/0103221 A1* | 6/2003 | Natori ........................ 358/1.9 |
| 2003/0142325 A1* | 7/2003 | Leslie ........................ 358/1.1 |
| 2004/0049741 A1* | 3/2004 | Natori ........................ 715/527 |
| 2004/0080778 A1* | 4/2004 | Ito et al. .................... 358/1.14 |
| 2005/0275872 A1* | 12/2005 | Otsuki ....................... 358/1.15 |

* cited by examiner

*Primary Examiner*—Tariq Hafiz
*Assistant Examiner*—Aurangzeb Hassan
(74) *Attorney, Agent, or Firm*—Fitzpatrick, Cella, Harper & Scinto (57) ABSTRACT

To enable simple and detailed confirmation of an operation instruction from an operation panel provided to a printer, each time an instruction is given using a preview button in the operation panel of the printer, an interruption event transferred from the printer to a host computer is detected, and in accordance with the detected interruption event, image data read out from a memory card attached to the printer, and a print setting to be set, are obtained. A preview display unit controls a print preview display reflecting the print setting in real time to a display device of the host computer, and also controls an update display of the print preview display.

16 Claims, 9 Drawing Sheets

STORAGE MEDIUM SUCH AS FD/CD-ROM ETC.

| DIRECTORY INFORMATION |
|---|
| FIRST DATA PROCESSING PROGRAM<br>PROGRAM CODE GROUPS CORRESPONDING TO STEPS IN FLOW CHART SHOWN IN FIG.5 |
| SECOND DATA PROCESSING PROGRAM<br>PROGRAM CODE GROUPS CORRESPONDING TO STEPS IN FLOW CHART SHOWN IN FIG.6 |

PRINT SYSTEM, INFORMATION PROCESSING DEVICE AND CONTROL METHOD FOR THE SAME, PRINTER AND CONTROL METHOD FOR THE SAME, STORAGE MEDIUM, AND PROGRAM

BACKGROUND OF THE INVENTION

1. Field of the Invention

The present invention relates to control of a print system in which a printer driver communicably connects a printer and a host computer, each having a communication interface for mutually sending/receiving information in real time.

2. Related Background Art

Conventionally, when using a printer for printing a digital image captured by a digital camera or the like, a method has been generally used in which the digital image is stored into a hard disk of a PC, and then software running on the PC is used to browse, edit and print the digital image.

Further, recent printers are provided with a card slot for inserting a recording medium used in a digital camera, and an operation panel for receiving a print setting instruction from a user, and have a function for printing a digital image in the recording medium by just the printer itself, without connecting to the PC.

In some of the printers described above, the image is displayed on a dedicated liquid crystal monitor provided to the printer, or on an externally connected monitor. The operation panel is used to perform settings and printing while viewing the display.

However, the above-mentioned printing method that is executed via the host PC, requires to perform operations of the software on the PC, which may require mouse and keyboard operations. Thus, the printing could not always be performed easily.

Moreover, in the case of the printer having the card slot and the operation panel, the operations are easy. However, a display unit of the operation panel and the dedicated monitor are small, and therefore it is difficult to perform the print settings and browse the image. Furthermore, the printing is performed by just the printer itself, so that high costs are required for materials such as a CPU, memory, and the like inside the printer. Its printing speed and print quality are also inferior as compared to printing via the host PC.

SUMMARY OF THE INVENTION

An object of the present invention is to solve all, or at least one, of the above-mentioned problems.

A feature of the present invention is that both of printing with simple operations and confirmation of detailed information can be simultaneously achieved.

Another feature of the present invention is that both of a simple operation of a printer or other image output device and detailed confirmation of an output form of a personal computer or other information processing device can be simultaneously achieved.

To achieve the above-mentioned features, the present invention discloses a print system including a printer and a computer communicated with each other, wherein the printer includes:

an operation panel for receiving a print setting instruction from a user;

an operation panel controller for generating an interruption event to the computer, according to the instruction received by the operation panel; and a printer engine for performing printing, and wherein the computer includes:

detecting means for detecting the interruption event from an external device; and a display control unit for displaying a print preview in which a print setting is reflected in real time, in response to detecting the interruption event by the detecting means.

Further, still another feature of the present invention is that while utilizing a personal computer's advanced throughput and a display power of a display device capable of detailed displays, image output can be performed by simple operations.

Additional objects and features of the present invention will become apparent from the following explanations of embodiments and the accompanying drawings.

DESCRIPTION OF THE PREFERRED EMBODIMENTS

Figure 1:
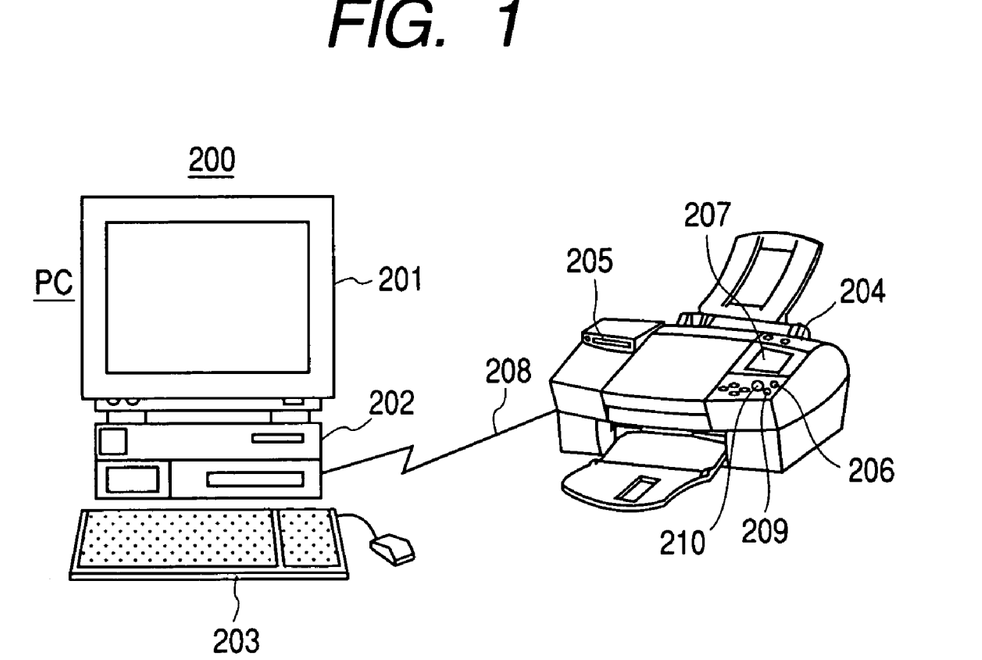
FIG. 1 is a diagram showing an example of a print system according to an embodiment.

FIG. 1 is a diagram showing an example of a printing system according to an embodiment of the present invention. As an example, the printing system of FIG. 1 corresponds to one in which an information processing device (including a display device 201, a controller 202, an input device 203, etc.) 200 installed with a printer driver is connected via a USB interface to an ink jet printer (a printer 204) having a direct print function for reading and directly printing predetermined standardized image data stored in a memory device (a memory card) attached to a digital camera or the like, or for reading and directly printing predetermined standardized image data stored in the memory device in a state communicable via a predetermined interface with the digital camera to which the memory device is attached.

In the printer 204 shown in FIG. 1, reference numeral 205 denotes a media slot, which is inputted into the memory device storing the image obtained using a digital camera or the like, which is not shown in the diagram. Reference numeral 206 denotes an operation panel. The operation panel 206 is arranged with various operation keys, so that instructions can be given to a print setting menu displayed on a liquid crystal panel 207, to set a printing format.

Note that, the example of the print system according to the present embodiment is a system in which the PC 200 and the printer 204 are connected by a communications unit (e.g., a USB) which can attain bi-directional communication. Further, the printer also includes a card slot for inserting a Compact Flash (registered trademark) or other memory card, and an operation panel 206 constituted of a liquid crystal panel and buttons for performing various print settings and print operations.

According to the printer 204, when a memory card on which image data captured with the digital camera is recorded is inserted into the card slot 205, print settings are inputted by the operation panel 206, and thereby the image data on the memory card can be printed. That is, even without using the PC, image data can be printed by using the printer alone, in accordance with the settings of paper, layout, quality, etc. Note that, hereinafter, the printing processing using the printer alone is in some cases referred to as "direct printing".

Further, in the print system according to the present invention, a view button 209 is arranged on the operation panel 206. When the view button 209 is depressed, the application running on the PC 200 is activated, and a preview display of the image to be printed based on the print settings set with the operation panel 206 is performed.

Furthermore, when the print settings are changed using the operation panel 206, the preview display is updated as needed. Further, when the print start button 210 on the operation panel 206 is depressed while the application is operating, the direct printing using the printer alone is not performed. Instead, the image data inside the memory card is transferred to the PC 200, the PC 200 performs various image processing necessary for printing, and the print data is returned to the printer to execute the print processing.

When the view button 209 is depressed a second time, the above-mentioned application is closed.

As described above, according to the print system of the present embodiment, the preview can be viewed and printed not only when performing the direct printing, but also when performing the printing via the PC, simply by an operation on the operation panel of the printer.

Detailed explanation is given below regarding the print system of the present embodiment.

Figure 2:
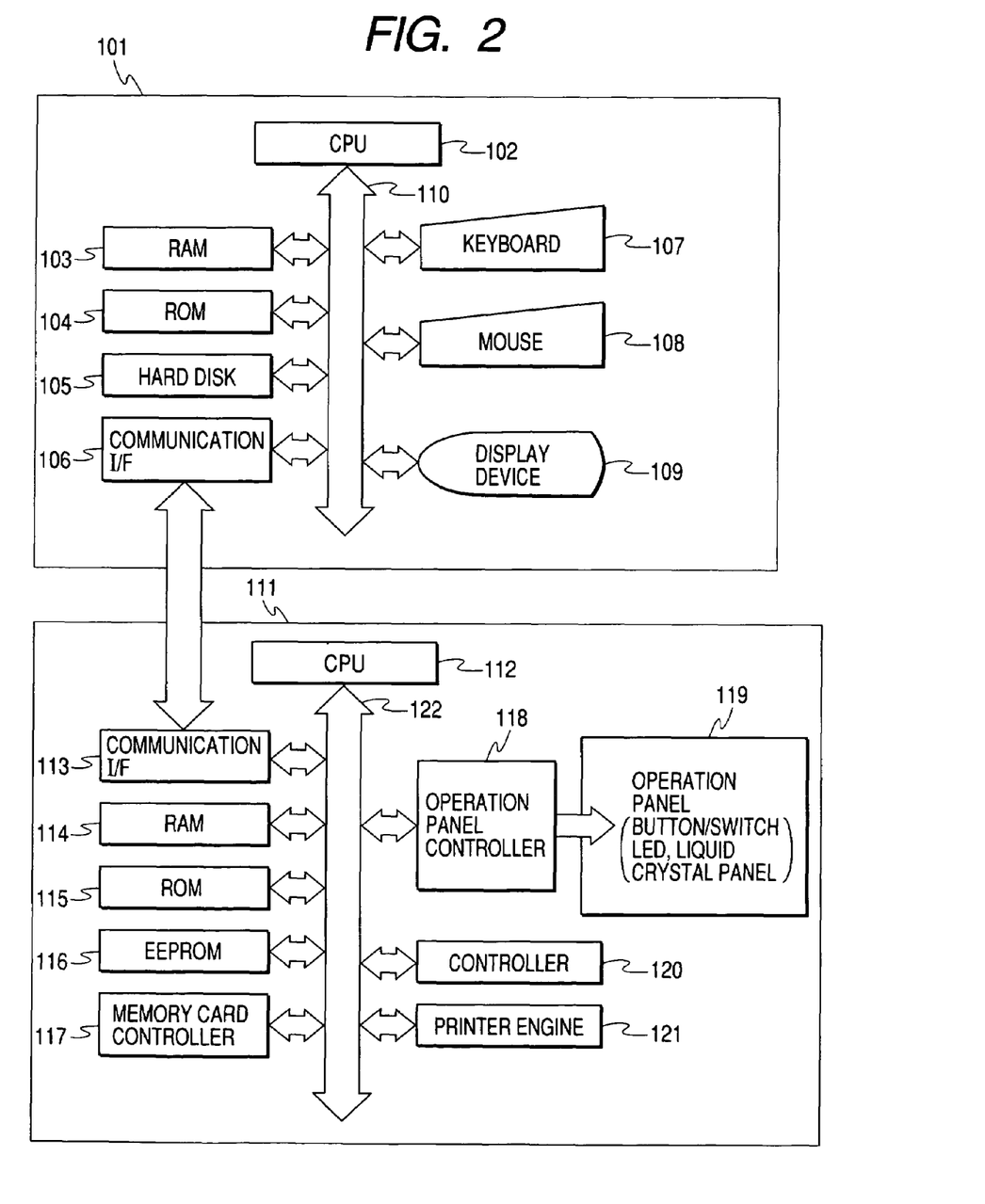
FIG. 2 is a block diagram for explaining a construction of the print system according to an embodiment.

FIG. 2 is a block diagram explaining a construction of the print system according to an embodiment of the present invention, and corresponds to a basic construction example of a printer 111 and a personal computer (hereinafter, abbreviated as "PC") 101.

In FIG. 2, the PC 101 includes: a central processing unit (CPU) 102 for calculating, judging, and controlling data and commands; storage units including a RAM 103, a ROM 104, a hard disk 105, and the like for storing an operating system (hereinafter, abbreviated as "OS") and other control programs; a communication I/F 106 such as a USB, an SCSI, or a cordless interface for performing data communications with the printer; input devices including a keyboard 107 and a mouse 108 each being used as a user interface; a display device 109 constituted of a graphic controller, a CRT, and a liquid crystal display; and a system bus 110. Note that, a printer driver for controlling the printer 11 is installed onto the hard disk 105.

The printer 111 includes: a central processing unit (CPU) 112 for calculating, judging, and controlling data and commands; a RAM 114 used as a temporary storage area for various data and as a print buffer; a ROM 115 which is a read-only storage area for the operating system and other control programs; a non-volatile memory (EEPROM) 116 used as a storage area for printer engine information, etc.; a communication I/F 113 for performing bi-directional communication with the PC; a memory card controller 117 for reading out data from the memory card; an operation panel 119 and an operation panel controller 118 respectively constituted of various buttons and switches used for turn-on of power, reset, perform various settings, start/stop printing, etc., and an LED, and a liquid crystal panel; a controller 120 constituted of an ASIC and the like for image processing; and a printer engine 121 including an LF motor, a carriage motor, a print head, and various sensors. Note that, reference numeral 122 denotes a system bus.

As to the print system of the present embodiment, the communication between the PC and the printer using a Universal Serial Bus (hereinafter, abbreviated as "USB") is explained as an example. In particular, the communication interface of the print system of the present embodiment corresponds to two USB data transfer formats: a bulk transfer format suitable for transferring large quantities of data; and an interrupt transfer format suitable for communications performed with the mouse or other user interface. Data transfer of the image data and the print data uses the bulk transfer format, and the data transfer from the operation panel information uses the interrupt transfer format.

Figure 3:
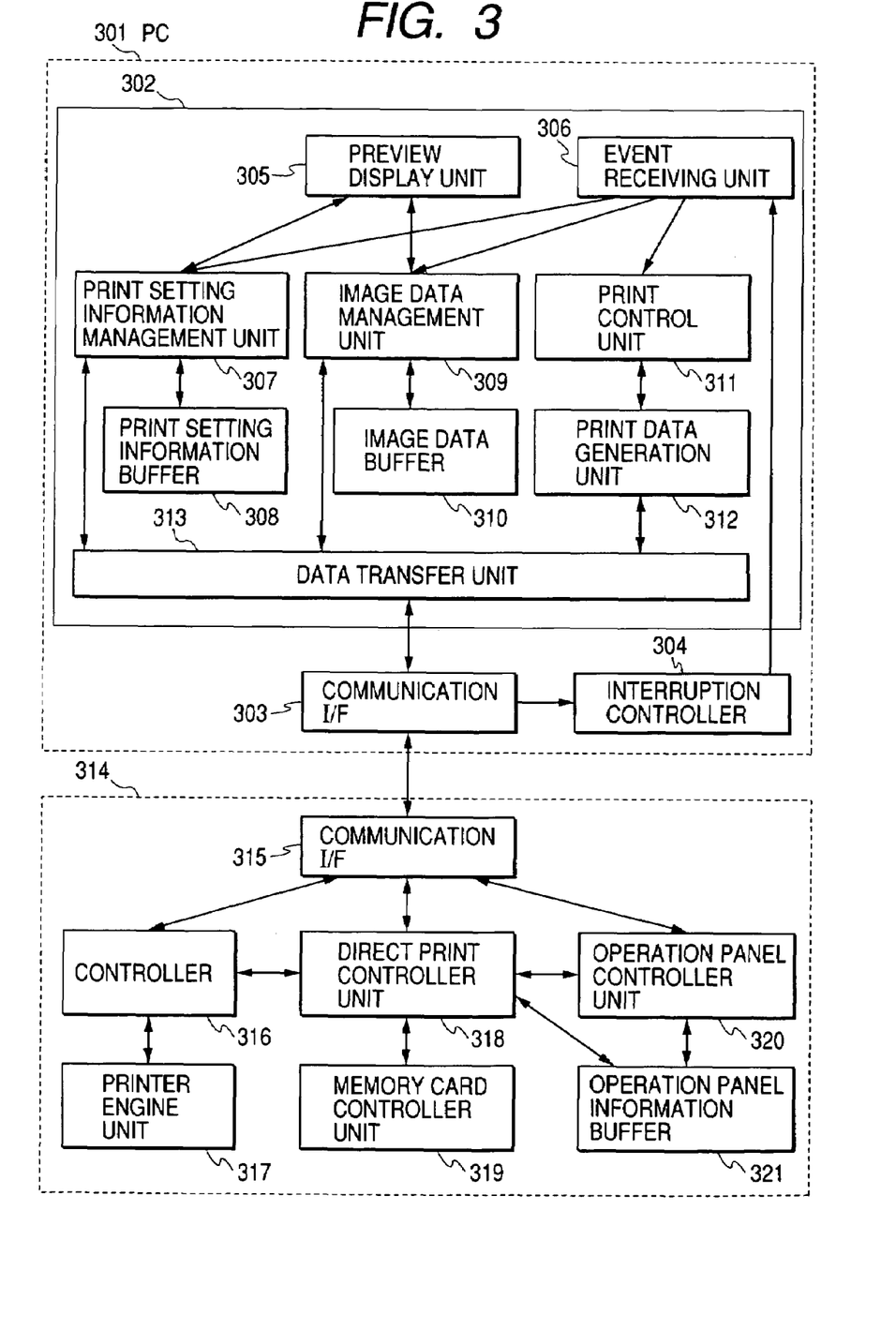
FIG. 3 is a block diagram showing a construction for data processing in accordance with the print system shown in FIG. 2.

FIG. 3 is a block diagram illustrating a data processing structure of the print system shown in FIG. 2.

In FIG. 3, the communication I/F 303 is constituted of a host controller for controlling the bi-directional communication using the USB, a port driver, a hub driver, and the like. Generally, the communication I/F 303 is incorporated into an operation system.

An interruption controller 304 notifies the application 302 of an interruption event produced by the operation panel 119 of the computer and transferred using the interrupt transfer format.

The interruption controller 304 of the present embodiment corresponds to a class device HID (Human Interface Device) of USB, which is generally used for the mouse or for the keyboard. The HID is constructed of a class driver and its management software. These components are generally incorporated into the operation system.

The application 302 performs the preview display and print processing of the image data recorded on the memory card inserted into the card slot of the printer.

The operation panel 119 is used to activate and quit the application 302, perform the printer settings, select an image, and perform print controls such as print start and print stop.

Hereinafter, the software constituting the application 302 is explained.

An event receiving unit 306 discriminates an interruption event received from the interruption controller 304. In a case where a print setting information event is received, the print setting information management unit 307 is notified of the event. In a case where an image information event is received, an image data management unit 309 is notified of the event. In a case where a print control event such as print start or print stop is received, a print control unit 311 is notified of the event.

The print setting information management unit 307 receives the print setting information event and saves the setting information into a print setting information buffer on the RAM. The print setting information event is constituted of the currently selected print mode, paper size, paper kind, print quality, layout ID, number of copies, image correction information, etc.

Further, the print setting information is changed, the print setting information management unit 307 notifies a preview display unit 305 of the change.

The image data management unit 309 receives the image information event, obtains image data corresponding to the image information from the printer 314, and stores the image data in the image data buffer 310 on the hard disk.

Note that, the image information event is constituted of one or a plurality of image data IDs.

The image data ID is an ID for obtaining specific image data from the plurality of image data recorded in the memory card of the printer 314. The image data ID thus uniquely specifies image data, and is formed of a file name, image number, or the like.

The image data of the present embodiment is digital image data captured by a digital camera, for example. The image data is created in JPEG or TIFF format. The image data management unit 309 has a JPEG decoding function.

Further, the digital camera image generally includes a small-sized thumbnail image.

The image data management unit 309 independently manages reading of the thumbnail image and reading of its actual image.

Further, the image data management unit 309 notifies the preview display unit 305 that the image information is changed. At this time, the image data management unit 309 performs thumbnail image reading completion notification, and actual image reading completion notification, independently, and immediately displays the thumbnail image for the preview, and after that switches to the actual image display. Accordingly, the preview display is updated without delay.

The print control unit 311 receives and discriminates the print control event. In a case of a print start request, a print data generation unit 312 is notified of the print start request. In a case of a print stop request, the print data generation unit 312 is notified of the print stop request.

Further, the print control unit 311 monitors error events occurring at the print data generation unit 312. In a case where the error content is discriminated as recoverable, a direct print request is sent to the printer 314. The controller 316 controls the print processing performed at a printer engine unit 317.

Accordingly, in a case where it is difficult to continue the printing processing via the PC 301, or in a case where printing processing speed suffers dramatically, the direct printing using the printer unit alone is executed, whereby the printing can be performed without problems.

The print data generation unit 312 receives the current print setting information from a print setting information buffer 308 via the print setting information management unit 307, and receives the image data from the image data buffer 310 via the image data management unit 309. In accordance with the print setting information, the image data (which is RGB full-color, multi-value bitmap data) is converted into Yellow (Y), Magenta (M), Cyan (C) and Black (K) binary luster format bit-map data, by performing variable multiplication processing, half-tone processing, complementary color conversion, binary processing, and the like. Then, a print command is generated from this bitmap data.

The generated print command is sent to the printer 314 via a data transfer unit 313.

Further, while generating the print data, if the print data generation unit 312 detects memory shortage, or insufficient CPU assignment time, or other shortage of resources necessary for processing, the print data generation unit 312 sends an error event to the print control unit 311, and stops the print data generation processing.

The preview display unit 305 receives the current print setting information from the print setting information buffer 308 via the print setting information management unit 307, and receives the image data from the image data buffer 310. In accordance with the print setting information, the preview display unit 305 generates the print preview image from the image data, and displays this image on the display device 109 on the PC 101.

Further, in order to reflect operations of an operation panel of the printer 314 (corresponding to the operation panel 119 shown in FIG. 2) on the preview display in real time, every time an image information update event from the image data management unit 309 and a print setting information update event from the print setting information management unit 307 are received, the preview display unit 305 performs the above-mentioned updating processing to generate the print preview image and to display the image on the display (the display for the display device 109 on the PC 101).

Further, the preview display unit 305 uses characters and icon expressions to display information that is useful to the user concerning the print setting information, such as the currently selected paper size, the paper kind, etc., on the display device 109 on the PC 101.

In FIG. 3, the printer 314 has a function for printing from a commonly used PC, and a direct printing function for printing the image data recorded in the memory card by using the printer alone.

Further, as a user interface, the printer 314 includes an operating unit, which is constituted of a liquid crystal panel, various buttons/switches, and an LED.

The operation panel controller unit 320 controls the operation panel 119 shown in FIG. 2 and constituted of the button/switch, the LED, and the liquid crystal panel, and saves the operation panel information into the operation panel information buffer 321.

Further, the operations panel controller unit 320 produces each type of interruption event, and sends the interruption event through a communication I/F 315 to the PC 301.

The memory card controller unit 319 reads the image data from the storage medium (including every type of media) which is inserted into the card slot.

When a print start button on the operation panel 119 is depressed, a direct print controller unit 318 reads out the operation panel information stored in the operation panel information buffer 321, and based on this information, obtains the image data from the memory card controller unit 319 to generate the print data.

Further, in the case where the direct print controller unit 318 receives the direct print request from the PC, the print data is generated by the same processing.

At the time of the direct printing, the printer engine unit 317 uses the print data generated at the direct print controller unit 318 to execute the print processing.

Further, when performing the printing from the PC 301, the print processing is executed according to a print command received by the communication I/F 315.

Figure 4:
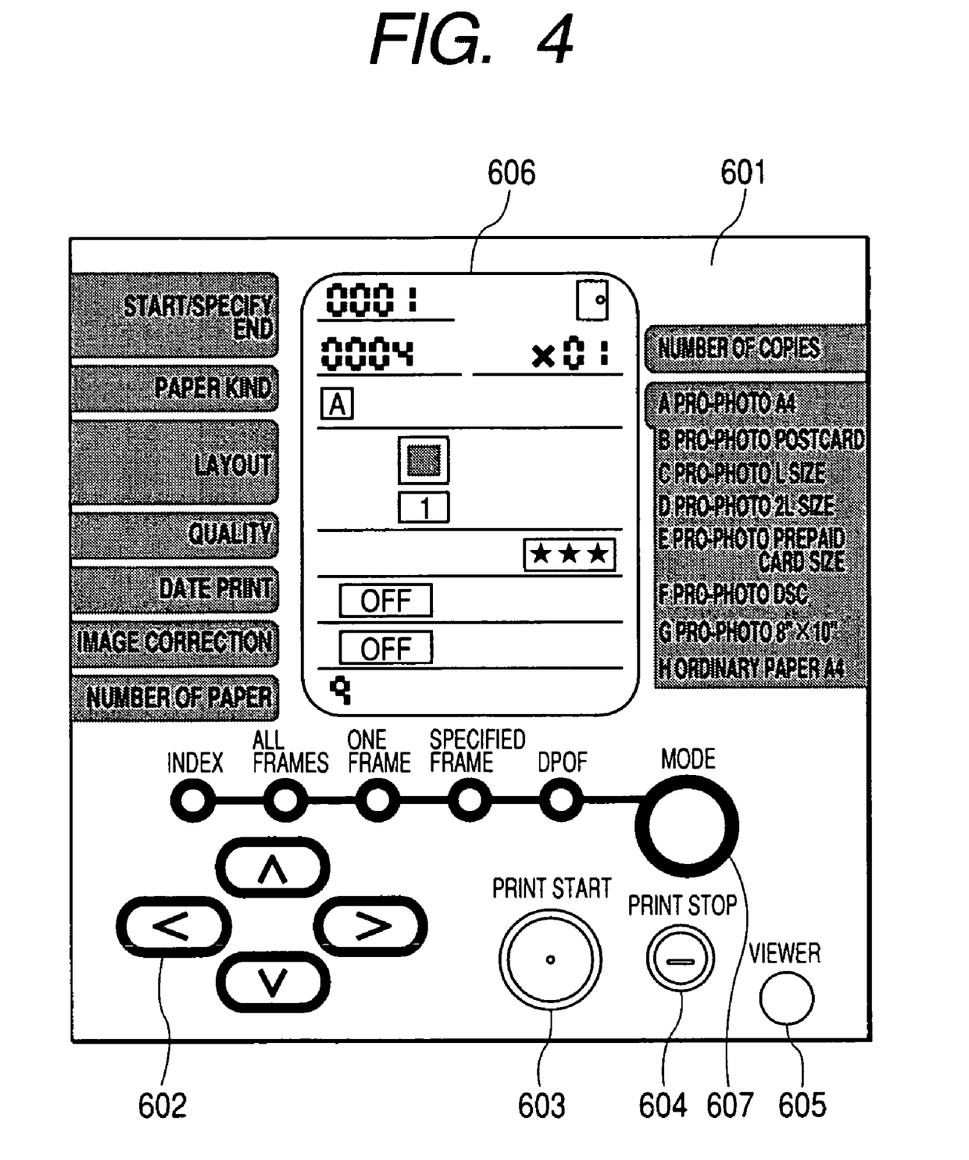
FIG. 4 is a plan diagram for explaining a detailed construction of an operation panel of a printer shown in FIG. 1.

FIG. 4 is a plan diagram showing a detailed construction of an operation panel of the printer 204 shown in FIG. 1.

In accordance with an operation panel 601 shown in FIG. 4, reference numeral 602 denotes printer setting buttons, which are instructed when selecting items displayed on a liquid crystal panel 606. Reference numeral 607 denotes mode setting buttons, which are configured for toggle selection of the print mode among an index mode, an all-frame mode, a single-frame mode, a designated frame mode, a DPOF mode, and the like.

Note that, Design rule for Print Order Format (DPOF) (registered trademark) is a recently standardized technical format. DPOF stipulates a method of recording information designating an image which should be printed, and a print control file designating a print format. The DPOF mode is an automatic print mode utilizing the print control file.

Note that, whether setting items must be selected or not is determined depending on the selected print mode.

Reference numeral 603 denotes a print start button, which is instructed when printing the buffered print data, and also when starting direct printing. Reference numeral 604 is a print stop button, which is instructed when stopping the printing processing.

Reference numeral 605 denotes a view button. For example, when activating the application 302 running on the PC 301 shown in FIG. 3 to perform the preview display, the view button is instructed. When the view button 605 is depressed/instructed, the interruption event is instructed to the interruption controller 304 via the operation panel controller unit 320 and the communication I/Fs 315 and 303.

The reference numeral 606 denotes a liquid crystal panel. While confirming the items displayed on the liquid crystal panel 606, the user operates the print setting buttons 602 to select the various items of the print mode, a print start image number, a print end image number, the number of print copies, the paper kind, the paper size, the layout, the print quality, whether or not to print the data, and whether to make image corrections.

Next, explanation is given regarding details of the processing procedure of the application 302 shown in FIG. 3.

Figure 5:
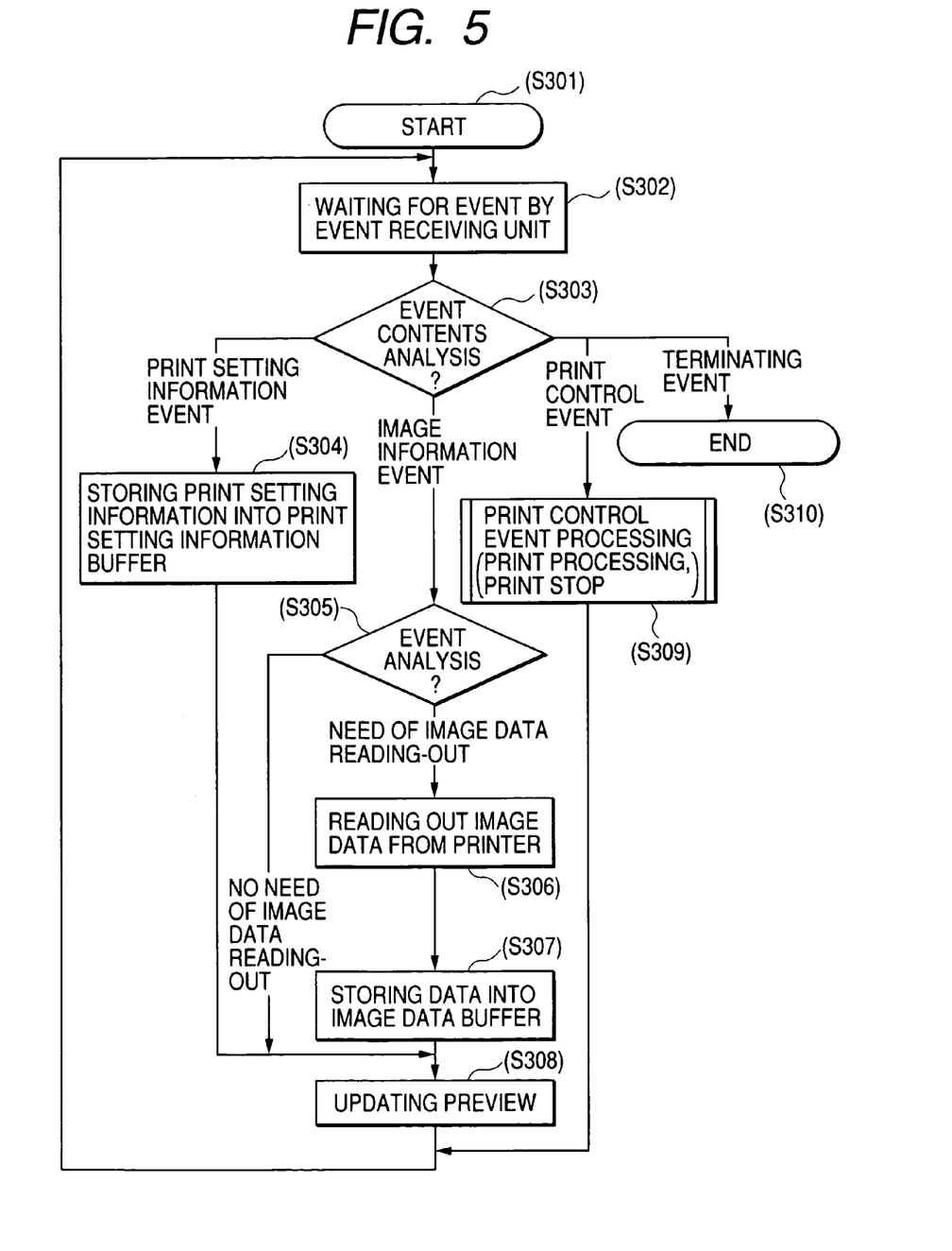
FIG. 5 is a flowchart showing an example of a first data processing sequence of the print system according to the embodiment.

FIG. 5 is a flowchart showing an example of a first data processing procedure of the print system according to the present invention, and corresponding to the processing sequence performed by the application 302 shown in FIG. 3. Note that, S301 to S310 denote each step of the procedure.

When the user presses the view button 605 on the operation panel 601 of the computer, the processing is started (S301).

At step S302, the event receiving unit 306 waits for the event from the interruption controller 304. When the interruption event is received, the event content is analyzed at step S303. If it is determined that the event content is the print setting information event, the procedure branches off to processing at step S304. If it is determined that the event content is the image information event, the procedure branches off to the processing of step S305. If it is determined that the event content is the print control event, the procedure branches off to processing of step S309.

Then, at step S304, the print setting information management unit 307 temporarily stores the print setting information in a memory (e.g., a print setting information buffer secured on the RAM 103 shown in FIG. 2), and notifies the preview display unit 305 that the print setting information is changed.

When receiving this notification, the preview display unit 305 updates the preview display (S308) in accordance with the notification content, and the procedure returns to step S302.

On the other hand, at step S305, the image information event received at the image data management unit 309 is analyzed, and if it is discriminated that the selected image is already stored in the image data buffer 310, then it is not necessary to read the image data from the printer. Therefore, at step S308, the preview updating processing is performed immediately, and the procedure returns to step S302.

Concerning the analyses performed at step S305, if it is discriminated that the selected image data is not stored in the image data buffer 310, the image data is read out from the memory card of the printer 314 via the data transfer unit 313 (S306).

At step S307, the read out image data is saved into the image data buffer 310. At step S308, the preview updating processing is performed. The procedure then returns to step S302.

Meanwhile, at step S309, various types of data processing (explained in detail using FIG. 6) based on the print control event received by the print control unit 311 are executed. Then, the procedure returns to step S302.

Figure 6:
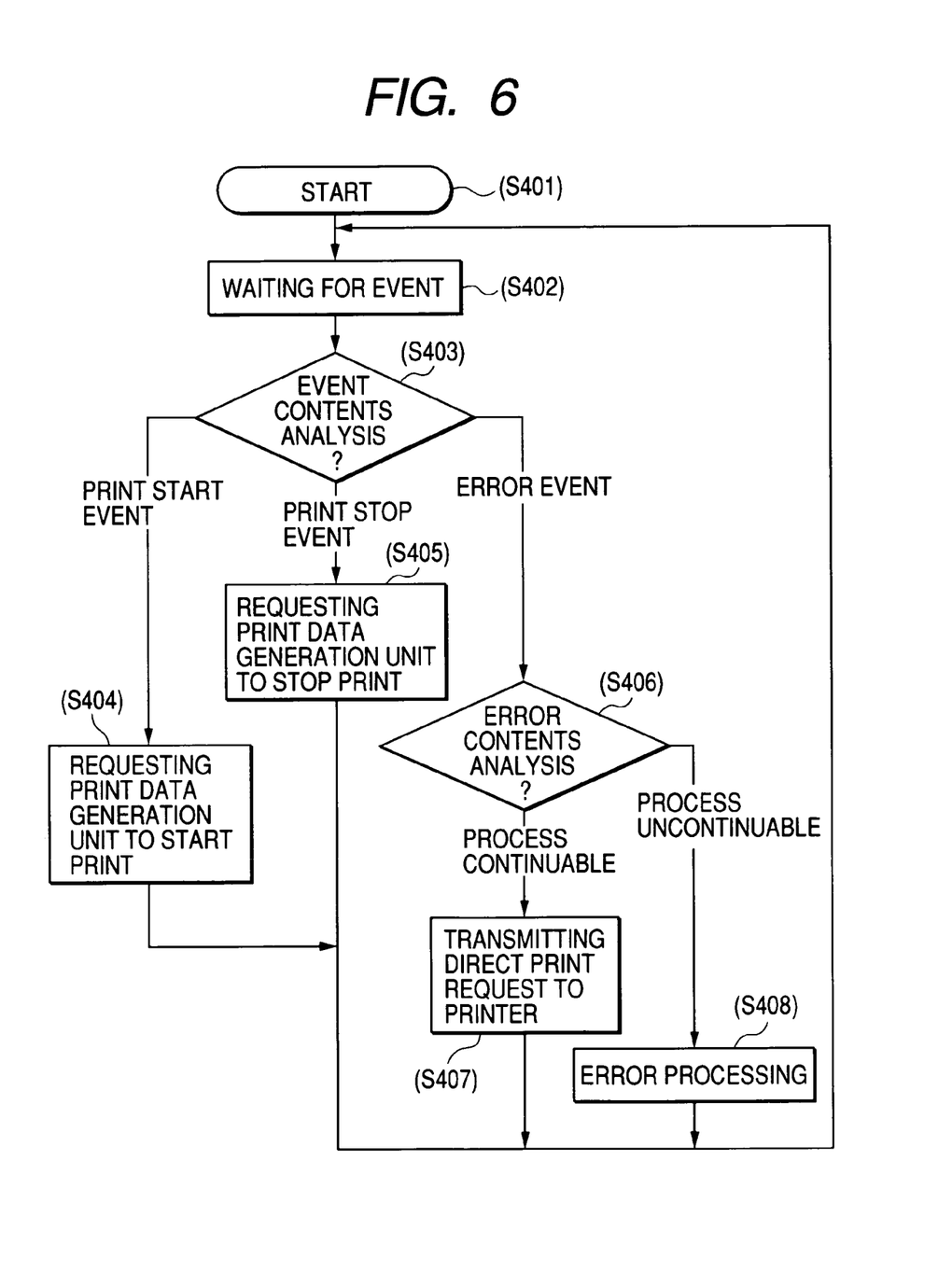
FIG. 6 is a flowchart showing an example of a second data processing sequence of the print system according to the embodiment.

FIG. 6 is a flowchart showing one example of a second data processing procedure of the print system according to the present invention. The flowchart corresponds to the detailed data processing procedure of step S309 shown in FIG. 5. Note that, S401 to S408 denote each step of the procedure.

At step S401, the processing is started. At step S402, the procedure is waiting for the event from the printer 314 and the event from the CPU 102. At step S303 shown in FIG. 5, when the print control event is received, the content of that event is analyzed (S403). If the event content is determined as the print start event, the print data generation unit 312 generates the print command and sends it to the printer 314 (S404), and the procedure returns to step S402.

At step S403, if it is determined that the event content is the print stop event, then the print processing at the print data generation unit is stopped (S405), and the procedure returns to step S402.

On the other hand, at the print control unit 311, if it is discriminated that the error event from the print data generation unit 312 is received, the error content is analyzed (S406). In a case where the PC 301 can operate but the memory or other resources are insufficient and it is difficult for the PC 301 to perform the print data generation and the image correction processing according to the print settings, then at step S407 the direct print request is sent to the printer 314, and the printing using the printer unit alone is executed (S407) without the intermediation of the PC 301. Then, the procedure returns to step S402.

Meanwhile, at step S406, in a case of an event indicating that it is impossible to continue the processing on the PC 301, an error display or other error processing is performed (S408), and the processing returns to step S402.

Figure 7:
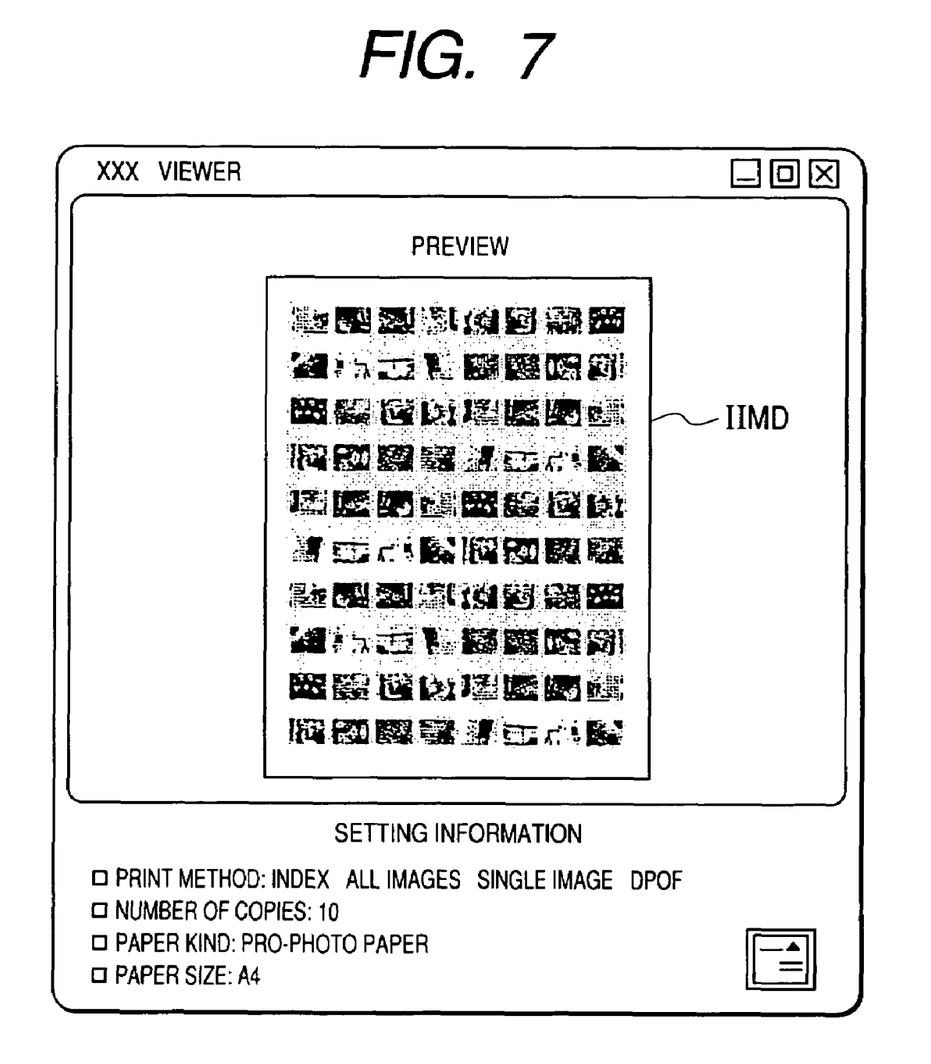
FIG. 7 is a diagram showing an example of a preview display by an image data viewer of the print system according to the embodiment.
Figure 8:
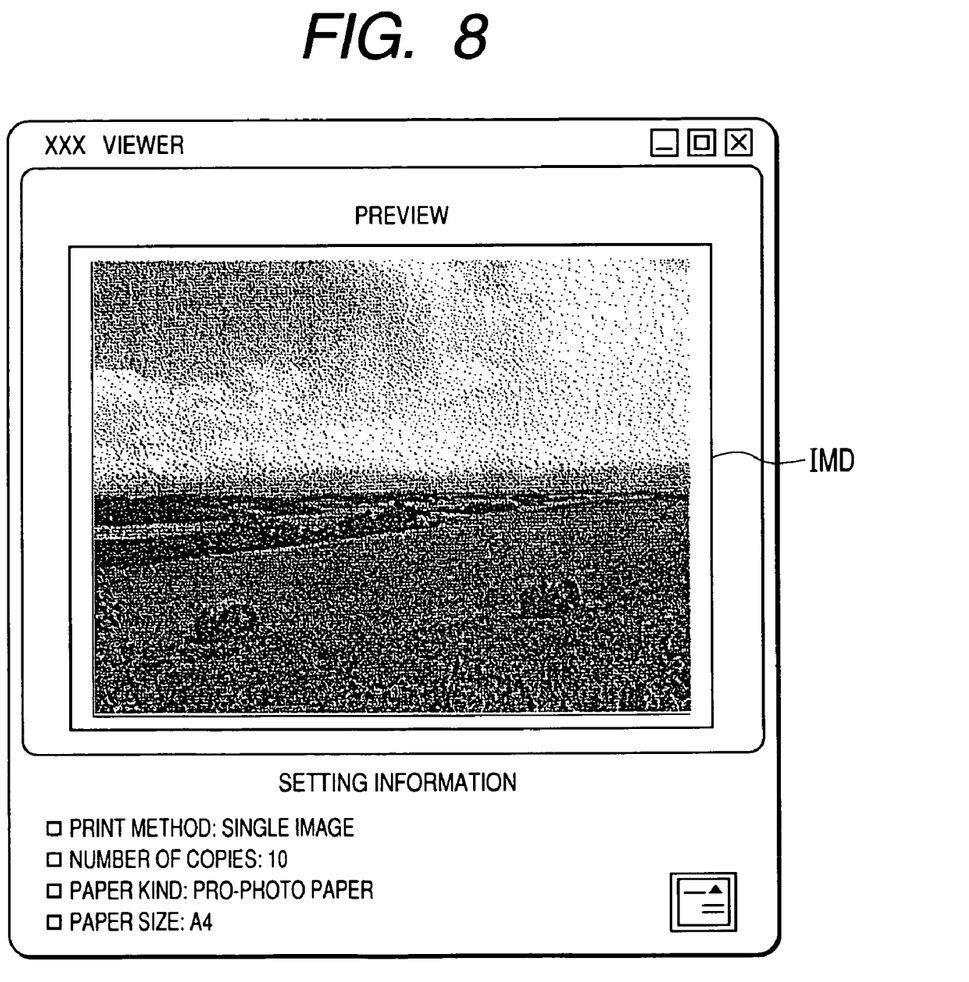
FIG. 8 is a diagram showing another example of a preview display by the image data viewer of the print system according to the present invention.

FIGS. 7 and 8 are diagrams each showing a display example appearing on an image data viewer of the print system in accordance with the present invention. The preview display example shown in FIG. 7 corresponds to a preview display status of an index image IIMD. The preview display example shown in FIG. 8 corresponds to a preview display status (a display status concerning, for example, the display device 109 shown in FIG. 2, which is connected to the PC 101) of the image (the image data IMD stored in the memory card) selected according to an instruction by the view button 605 on the operation panel 119 of the printer 314.

Note that, by giving the instruction using the print setting button 602 shown in FIG. 4, the desired image data is selected with reference to the currently displayed image as a start point. By depressing the view button 605, steps S303 and S305 to S308 shown in FIG. 5 are executed, and thus the previewed image data IMD is updated and displayed.

Further, the image start point to be displayed may be freely chosen. The display order may be changed according to sequence of recording or chronological sequence, or changed by keys capable of retrieval. Any of these configurations are within the applicable scope of the present invention.

Moreover, the applicable scope of the present invention includes a configuration in which, when the view button 605 is depressed/instructed, the image data content recorded in the memory card is updated at regular intervals, and the image data preview is controlled for a cyclical display.

Further, in accordance with the present invention, at the preview display time, the print format (the print method, the number of copies, the paper kind, the paper size, etc.) selected using the operation panel 601 is displayed as well. Therefore, the setting status can be simultaneously visually confirmed by the user.

Note that, the print settings that can be set using the printer operation panel may include image color-correction processing and image processing such as rotation, inversion, trimming, etc. According to the print setting operation, images in the memory card can be transferred to the printer in real time. Alternatively, the image data stored in the PC can be read out, and the color-correction processing and other image processing according to the print settings can be performed on the image, and then image is displayed on the display device.

Furthermore, in accordance with the above-mentioned embodiment, explanation is given regarding an example in which the image in the memory card is preview-displayed by the instruction from the view button 605 in the operation panel 601. However, depending on the needs of the user, a similar button can be placed in the preview screen displayed by the PC 301. The user can perform control to receive operations from input devices (e.g., the keyboard 107 and mouse 108 shown in FIG. 2) connected to the PC 301. Even in a case where the user moves about, the preview update/instruction operations can be performed from the PC 301 side, or from the printer 314 side.

Instead of performing the preview one image at a time, the preview can be performed in unit of images capable of a layout display. The layout print status can be previewed, and the layout print status (including arranging/outputting a plurality of images onto the paper, for example) can be confirmed by the user before starting printing.

Accordingly, the PC's high-performance image processing can be used for the image processing, and also, detailed information of the image can be confirmed on a large screen. Further, by using the operation unit of the printer, even a user who is unaccustomed to personal computers can perform high-level image processing settings.

Below, explanation is given regarding configuration of a data processing program which can be read using the print system according to the present invention, by referencing a memory map shown in FIG. 9.

Figure 9:
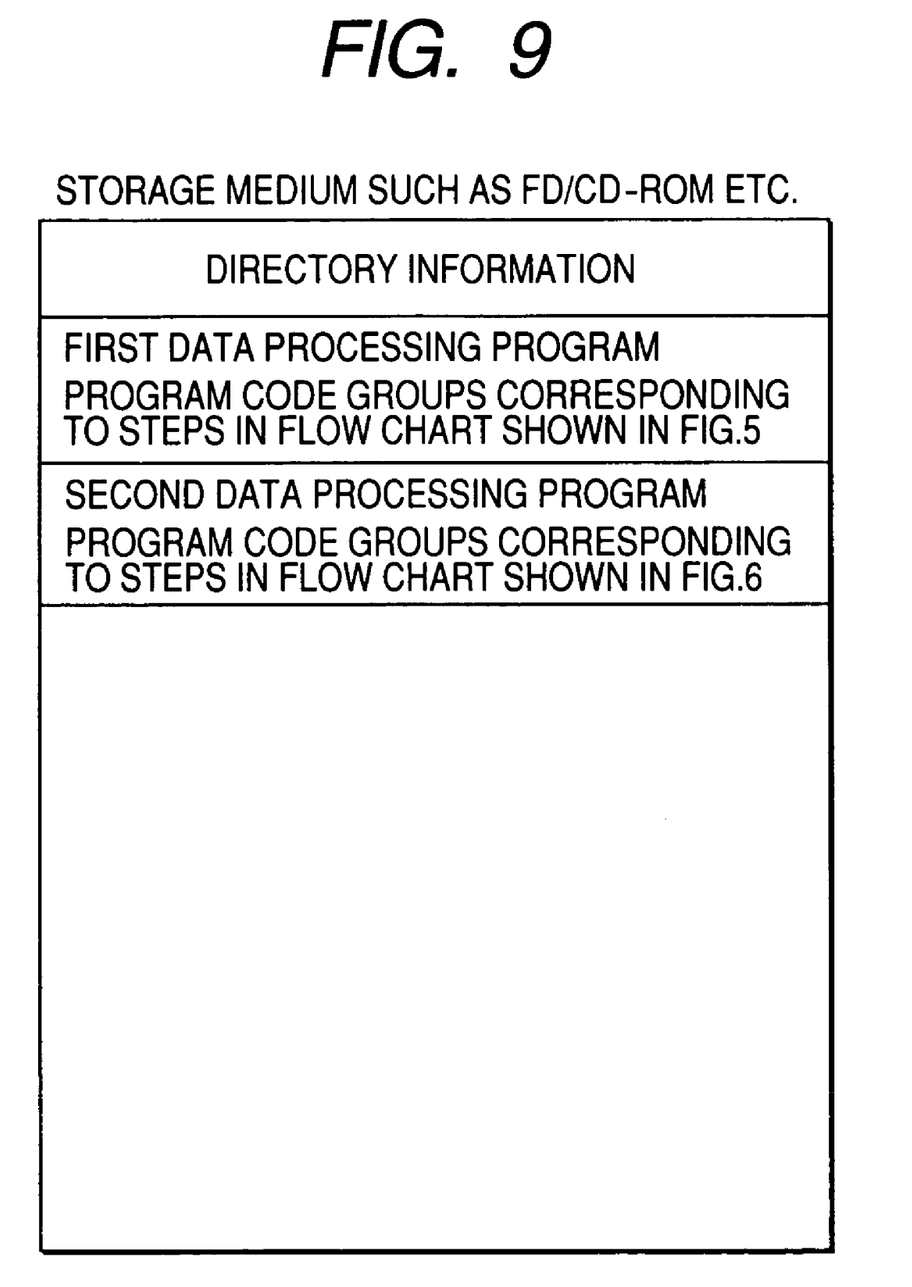
FIG. 9 is a diagram for explaining a memory map of a storage medium for storing various data processing programs readable by the print system according to the embodiment.

FIG. 9 is a diagram for explaining a memory map on a storage medium storing various data processing programs which are readable on the print system according to the present invention.

Note that, although not particularly shown in the diagram, it is also possible to store information (version information, an author, etc.) for managing a program group stored in the storage medium, and also information (e.g., an icon for distinctively displaying the program) which relies on the OS, etc. on the reading side.

Furthermore, the data dependent on each program can also be managed in the above-mentioned directory. Further, it is also possible to store programs such as a program for installing each type of program in the computer, and a program for decompressing the programs to be installed in a case where the programs are compressed.

The functions shown in FIGS. 5 and 6 according to the present embodiment may also be performed on a host computer, by means of a program installed from the outside. In such a case, the present invention is also applied in a case where an information group including the program is supplied to an output device, either by means of a CD-ROM, Flash Memory, FD or other storage medium, or from an external storage medium via a network.

As described above, a storage medium recording a software program code for realizing the functions of the above-mentioned embodiment can be supplied to a system or to a device, and a computer (or CPU or MPU) of that system or device can read out and execute the program stored in the recording medium, to thereby achieve the object of the present invention.

In such a case, the program code itself which is read out from the storage medium achieves the novel functions of the present invention, and the storage medium storing the program code constitutes the present invention.

As the storage medium for providing the program code, there can be used, for example, a flexible disk, a hard disk, an optical disk, a photo-magnetic disk, a CD-ROM, a CD-R, magnetic tape, a non-volatile memory card, a ROM, or an EEPROM.

Further, the present invention not only includes the case where the program read out by the computer is executed to achieve the functions of the above-mentioned embodiments. The present invention also includes a case where, based on the instructions in the program code, an operating system (OS) or the like running on the computer performs a portion or all of the actual processing, and the processing realizes the functions of the above-mentioned embodiment.

Further, the present invention also includes a case where the program code read out from the recording medium is written into a function expansion board inserted into the computer, or written into a CPU provided to a function expansion unit connected to the computer, and then based on the instructions from the program code, the function expansion board or the CPU, etc. provided to the function expansion unit performs a portion or all of the actual processing, and the processing realizes the functions of the above-mentioned embodiment.

As explained above, according to the print system of the present invention, upon each instruction by the preview button on the operation panel of the computer, the interruption event transferred from the printer to the host computer is detected. In response to the detected interruption event, the image data read from the memory card attachable to the printer, and the print settings set by the operation panel, are obtained. By controlling the print preview display where the print settings are reflected in real-time in the host computer's display device, and the update display of the print preview display; the operation instructions from the operation panel of the computer are reflected in real-time without being restricted by the hardware resources on the printer side, and the user can browse the print preview of the image data in the memory card attached to the printer. Thus, the display device on the host computer side is superior in utility, and moreover, an inexpensive and fast preview system can be provided.

The present invention is not restricted to the embodiment described above. Various modifications are possible within the scope recited in the claims.

What is claimed is:

1. A print system which includes a printer arranged to connect to a host computer via a communication interface, wherein the printer includes a read-out unit for reading out image data from a recording medium on which the image data is recorded, an operation panel having thereon a print start button, a print setting button, and a preview display button, a printer engine for performing printing, and a print control unit for, in response to depression of the print start button, generating print data from the image data read out by the read-out unit in accordance with print settings provided based on operation of the print setting button, and for causing the print engine to print the generated print data, the printer further comprising:

a print setting event transmitting unit for transmitting the image data read out by the read-out unit to the host computer via the communication interface if the preview display button of the operation panel is depressed, and for generating a print setting event and transmitting the generated print setting event to the host computer, if the print setting button is operated after the preview display button is once depressed;

a print start event transmitting unit for generating a print start event and transmitting the generated print start event to the host computer, if the print start button is operated after the preview display button is once depressed; and a receiving unit for receiving print data which the host computer transmits to the printer on the basis of the print start event transmitted by the print start event transmitting unit, wherein the print control unit controls the printer engine to print the print data received by the receiving unit, and the host computer comprising:

a display unit for receiving the image data transmitted by the print setting event transmitting unit in response to depression of the preview display button, and displaying the received image data on a display apparatus;

an update unit for discriminating the print setting event transmitted to the host computer by the print setting event transmitting unit and updating the image data displayed on the display apparatus on the basis of the discriminated print setting event; and a control unit for discriminating the print start event transmitted by the print start event transmitting unit to the host computer, and for generating the print data from the image data transmitted to the host computer by the print setting event transmitting unit and transmitting the generated print data to the printer via the communication interface.

2. A print system according to claim 1, wherein the printer includes a direct print controller for effecting printing without the host computer so that printing is executable with the printer alone, when the preview display button has not yet been operated but the print start button is operated.

3. A print system according to claim 1, wherein the control unit generates the print data from the received image data in accordance with print setting information of the image data displayed by the display unit.

4. A print system according to claim 1, wherein the update unit updates the image data displayed by the display unit to effect print preview display such that print setting information included in the discriminated print setting event is reflected in the displayed image data.

5. A print system according to claim 3, wherein the printer starts printing on the basis of a print instruction transmitted by the host computer when the host computer receives the print start event transmitted by the print start event transmitting unit.

6. A control method of a print system which includes a printer arranged to connect to a host computer via a communication interface, wherein the printer includes a read-out unit for reading out image data from a recording medium on which the image data is recorded, an operation panel having thereon a print start button, a print setting button, and a preview display button, a printer engine for performing printing, and a print control unit for, in response to depression of the print start button, generating print data from the image data read out by the read-out unit in accordance with print settings provided based on operation of the print setting button, and for causing the print engine to print the generated print data comprising the steps of:

controlling the printer, comprising:

transmitting the image data read out by the read-out unit to the host computer via the communication interface if the preview display button of the operation panel is depressed, and generating a print setting event and transmitting the generated print setting event to the host computer, if the print setting button is operated after the preview display button is once depressed;

generating a print start event and transmitting the generated print start event to the host computer, if the print start button is operated after the preview display button is once depressed;

receiving print data which the host computer transmits to the printer on the basis of the transmitted print start event, and controlling the printer engine by the print control unit to print the received print data, controlling the printer engine by the print control unit to print the received print data, and controlling the host computer, comprising:

receiving the image data transmitted in the print setting event transmission in accordance with depression of the preview display button, and displaying the received image data on a display apparatus;

discriminating the print setting event transmitted to the host computer in the print setting event transmission and updating the image data displayed on the display apparatus, in accordance with the discriminated print setting event; and discriminating the print start event transmitted in the print start event transmission to the host computer and generating the print data from the image data transmitted to the host computer in the print setting event transmission, and transmitting the generated print data to the printer via the communication interface.

7. A method according to claim 6, wherein the printer control includes a step of effecting printing without the host computer so that printing is executable with the printer alone, when the preview display button has not yet operated but the print start button of the operation panel is operated.

8. A method according to claim 6, wherein the host computer generates the print data from the received image data in accordance with print setting information of the displayed image data.

9. A method according to claim 6, wherein the the displayed image data is updated to effect a print preview display such that the print setting information included in the discriminated print setting event is reflected in the displayed image data.

10. A method according to claim 8, wherein the printer control includes a step of starting printing on the basis of a print instruction transmitted by the host computer when the host computer receives the transmitted print start event.

11. A print system according to claim 1, wherein the print system is arranged such that in a case where the host computer effects print preview display, the host computer generates print data and the printer receives the print data generated by the host computer and prints the generated print data, and, in a case where the host computer does not effect the print preview display, the printer generates print data and prints the print data generated thereby.

12. A control method according to claim 6, further comprising a step of effecting control such that in a case where the host computer effects print preview display, the host computer generates print data and the printer receives the print data generated by the host computer and prints the generated print data, and, in a case where the host computer does not effect the print preview display, the printer generates print data and prints the print data generated thereby.

13. A print system according to claim 1, wherein the display unit displays the received image data with character information indicating a setting of size or type of a print sheet, thereby effecting a preview display.

14. A print system according to claim 1, wherein the update unit updates the image data displayed by the display unit in response to receiving of the print setting event such that the image data is subjected in real time to one of a plurality of image processes including color correction, rotation, inversion and trimming.

15. A printer arranged to connect to a host computer via a communication interface, comprising:
- a read-out unit for reading out image data from a recording medium on which the image data is recorded;
- an operation panel having thereon a print start button, a print setting button, and a preview display button;
- a printer engine for performing printing;
- a print control unit for, in response to depression of the print start button, generating print data from the image data read out by the read-out unit in accordance with print settings provided based on operation of the print setting button, and for causing the print engine to print the generated print data;
- a print setting event transmitting unit for transmitting the image data read out by the read-out unit to the host computer via the communication interface if the preview display button of the operation panel is depressed, and for generating a print setting event and transmitting the generated print setting event to the host computer, if the print setting button is operated after the preview display button is once depressed;
- a print start event transmitting unit for generating a print start event and transmitting the generated print start event to the host computer, if the print start button being operated after the preview display button is once depressed; and
- a receiving unit for receiving print data which the host computer transmits to the printer on the basis of the print start event transmitted by the print start event transmitting unit,
- wherein the print control unit controls the printer engine to print the print data received by the receiving unit.

16. A control method of a printer arranged to connect to a host computer via a communication interface, comprising:
- reading out image data from a recording medium on which the image data is recorded;
- operating an operation panel having thereon a print start button, a print setting button, and a preview display button, a printer engine for performing printing;
- generating, in response to depression of the print start button, print data from the read-out image data in accordance with print settings provided based on operation of the print setting button, and causing a print engine to print the generated print data;
- transmitting the read out image data to the host computer via the communication interface if the preview display button of the operation panel is depressed, and generating a print setting event and transmitting the generated print setting event to the host computer, if the print setting button is operated after the preview display button is once depressed;
- generating a print start event and transmitting the generated print start event to the host computer, if the print start button is operated after the preview display button is once depressed;
- receiving print data which the host computer transmits to the printer on the basis of the transmitted print start event, and
- controlling the printer engine to print the received print data.

* * * * *